(12) United States Patent
Harrer

(10) Patent No.: US 8,230,676 B2
(45) Date of Patent: Jul. 31, 2012

(54) EXHAUST SYSTEM FOR AN INTERNAL COMBUSTION ENGINE

(75) Inventor: Peter Harrer, Zweibrücken (DE)

(73) Assignee: J. Eberspaecher GmbH & Co., KG, Esslingen (DE)

( * ) Notice: Subject to any disclaimer, the term of this patent is extended or adjusted under 35 U.S.C. 154(b) by 1219 days.

(21) Appl. No.: 12/022,334

(22) Filed: Jan. 30, 2008

(65) Prior Publication Data

US 2008/0184700 A1    Aug. 7, 2008

(30) Foreign Application Priority Data

Jan. 30, 2007 (DE) .................. 10 2007 005 497

(51) Int. Cl.
*F01N 3/00* (2006.01)
*F01N 1/00* (2006.01)
(52) U.S. Cl. ........................... 60/286; 60/324
(58) Field of Classification Search .......... 60/286
See application file for complete search history.

(56) References Cited

U.S. PATENT DOCUMENTS

| 3,088,638 | A | * | 5/1963 | Nelson et al. | 222/478 |
|---|---|---|---|---|---|
| 4,674,888 | A | | 6/1987 | Carlson | |
| 4,866,932 | A | * | 9/1989 | Morita et al. | 60/288 |
| 4,929,088 | A | * | 5/1990 | Smith | 366/337 |
| 5,053,062 | A | * | 10/1991 | Barris et al. | 55/282 |
| 5,307,628 | A | * | 5/1994 | Castagne | 60/284 |
| 5,339,630 | A | * | 8/1994 | Pettit | 60/303 |
| 5,829,248 | A | * | 11/1998 | Clifton | 60/286 |
| 6,398,851 | B1 | * | 6/2002 | Bose | 95/273 |
| 6,401,455 | B1 | * | 6/2002 | Mathes et al. | 60/286 |
| 6,461,018 | B1 | * | 10/2002 | Chanslor | 362/249.16 |
| 6,722,123 | B2 | * | 4/2004 | Liu et al. | 60/286 |
| 7,028,663 | B1 | | 4/2006 | Kim | |
| 2005/0098147 | A1 | * | 5/2005 | Chen | 123/306 |
| 2007/0193252 | A1 | * | 8/2007 | McKinley et al. | 60/286 |

FOREIGN PATENT DOCUMENTS

| DE | 10 2004 020 138 A1 | 11/2005 |
|---|---|---|
| DE | 10 2006 011 890 A1 | 9/2007 |
| JP | 2002-349232 A | 12/2002 |
| WO | WO 9000929 A1 | 2/1990 |
| WO | WO 0021881 A1 | 4/2000 |
| WO | WO 0229219 A1 | 4/2002 |

OTHER PUBLICATIONS

European Search Report dated Apr. 16, 2008.

* cited by examiner

*Primary Examiner* — Thomas Denion
*Assistant Examiner* — Jason Shanske
(74) *Attorney, Agent, or Firm* — Howard IP Law Group, P.C.

(57) ABSTRACT

An exhaust system for an internal combustion engine, includes an exhaust line, an exhaust gas treatment device, an injection device arranged upstream from the exhaust gas treatment device for injecting a liquid educt into the exhaust line and a mixing and/or evaporation device for the sprayed educt situated downstream from the injection device and upstream from the exhaust gas treatment device. At least one section of the exhaust line carrying exhaust gas is formed by an exhaust pipe that has an end section arranged downstream from the injection device and upstream from the exhaust gas treatment device. The mixing and/or evaporation device is integrally formed on the end section of the exhaust pipe.

13 Claims, 3 Drawing Sheets

US 8,230,676 B2

EXHAUST SYSTEM FOR AN INTERNAL COMBUSTION ENGINE

FIELD OF THE INVENTION

The present invention relates to an exhaust system for an internal combustion engine, in particular in a motor vehicle.

BACKGROUND OF THE INVENTION

An exhaust system usually comprises an exhaust line carrying exhaust gas away from the internal combustion engine and at least one exhaust gas treatment device such as a catalyst, a particulate filter and a muffler as well as combinations thereof arranged in the exhaust line. In addition, an exhaust system may also have an injection device for injecting a liquid educt into the exhaust line, usually arranged upstream from an exhaust gas treatment device on the exhaust line. For example, a fuel may be injected into the exhaust line upstream from an oxidation catalyst to trigger an exothermic combustion reaction on the oxidation catalyst. For example, an oxidation catalyst arranged near the motor can be brought rapidly to its operating temperature in this way to thereby reduce pollution emissions in a cold start of the internal combustion engine. In addition, heat can thereby be introduced into the exhaust line, e.g., to heat a particulate filter arranged downstream from the oxidation catalyst to a regeneration temperature. Likewise, with such an injection device a reducing agent, e.g., ammonia can be sprayed into the exhaust stream to reduce nitrogen oxides entrained by the exhaust gas in an SCR catalyst arranged downstream. Instead of ammonia, urea and/or an aqueous urea solution may also be sprayed into the exhaust stream. A hydrolysis reaction creates ammonia and water from the urea-water solution. The ammonia thereby produced can be utilized again in an SCR catalyst to reduce the nitrogen oxides in the exhaust gas. Furthermore, with the help of the injection device, fuel or another suitable reducing agent may be sprayed into the exhaust stream upstream from an NOX storage catalyst to induce regeneration of the NOX storage catalyst.

To improve and/or allow the action of the educt that is sprayed into the exhaust line in liquid form, extensive evaporation is desirable, as is intense and thorough mixing with the exhaust gas to homogenize the exhaust gas-educt mixture. Accordingly the exhaust system can be equipped with a mixing and/or evaporation system arranged in the exhaust line downstream from the injection device and upstream from the respective exhaust gas treatment device.

The respective exhaust line in which the exhaust gas treatment device, the injection device and the mixing and/or evaporation device are installed is usually assembled from several components, e.g., multiple pipe bends, at least one exhaust manifold and several exhaust pipes which together form a section of the exhaust line that carries the exhaust gas. With an assembled design, such an exhaust pipe may protrude at an end section into another nearby pipe or into a housing of an exhaust gas treatment device.

SUMMARY OF THE INVENTION

The present invention is based on the general idea of integrating the mixing and/or evaporation device into an end section of an exhaust pipe which end section protrudes and/or is inserted into a neighboring component of the exhaust line and/or the exhaust system with which the exhaust pipe communicates. Such unitary construction eliminates a separate and additional part that forms the mixing and/or evaporation device and must also be installed in the exhaust line in an additional step. Accordingly, the integration of the mixing and/or evaporation device into the end section of the exhaust pipe leads to a price advantage with regard to the cost of materials and labor costs. This is especially important with regard to mass production products.

The integration of the mixing and/or evaporation device on the end section of the exhaust pipe means that the exhaust pipe and the unitary mixing and/or evaporation devices are manufactured in one piece. In particular, the mixing and/or evaporation device is formed directly on the exhaust pipe manufactured previously. The mixing and/or evaporation device may thus be formed by corresponding working of the end section of the exhaust pipe. The integration of the exhaust pipe with the mixing and/or evaporation device eliminates separate manufacturing of the exhaust pipe and the mixing and/or evaporation devices and subsequent assembly of these separate components to form a unit.

In an embodiment, the mixing and/or evaporation device formed as an integral part on the end section of the exhaust pipe has several baffles, which are formed in and/or on the end section through wall sections of the exhaust pipe that have been cut free and bent and shaped accordingly. In this way, the baffles and thus the mixing and/or evaporation devices can be created inexpensively out of the exhaust pipe that has already been manufactured previously.

For example, the end section of the exhaust pipe may be segmented by means of several axial cuts in the circumferential direction, thereby exposing and/or cutting several wall sections that are neighboring in the circumferential direction but are separated from one another here and/or are cut free. These may then be shaped through a corresponding bending deformation so that they can induce turbulence in the exhaust flow passing through the exhaust pipe.

In another embodiment, the baffles in the end section of the exhaust pipe are formed by axial machining and bending deformation of wall sections of the exhaust pipe to form the mixing and/or evaporation device. In axial machining, an area of the respective edge section on the inside radially is separated from the remaining edge section by machining. The resulting shaved piece then forms the baffle. In machining, the cutting operation is not completed so that the respective shaved piece thereby formed remains adhering firmly at one end to the remaining body of the pipe.

It is self-evident that the features mentioned above and those yet to be explained below may be used not only in the particular combination described here but also in other combinations or alone without going beyond the scope of the present invention.

Exemplary embodiments of the present invention are depicted in the drawings and explained in greater detail in the following description, where the same reference numerals are used to refer to the same or similar or functionally identical components.

BRIEF DESCRIPTION OF THE DRAWINGS

In each drawing schematically.

DETAILED DESCRIPTION OF THE INVENTION

Figure 1:
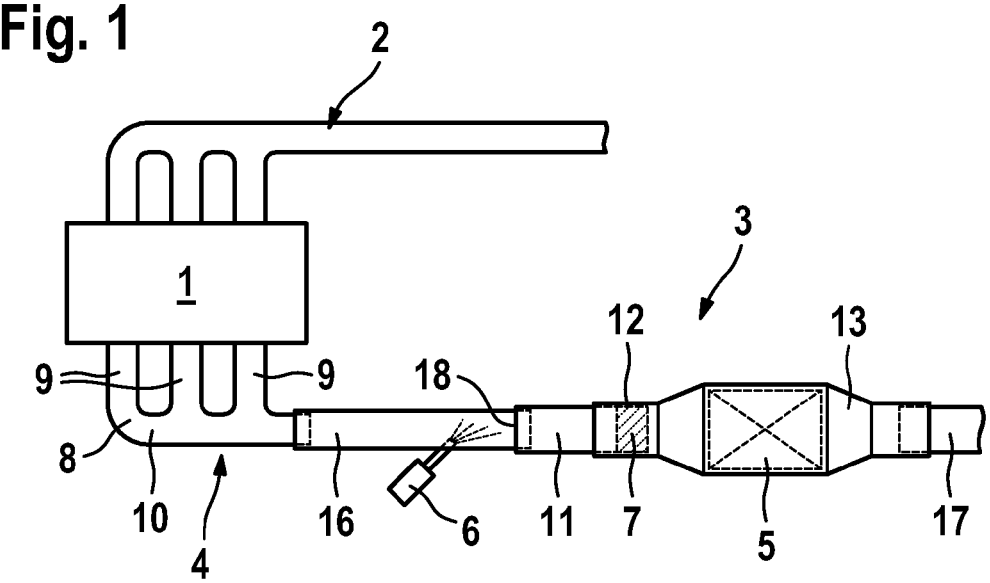
FIG. 1 shows a simplified basic diagram of an exhaust system.

According to FIG. 1, an internal combustion engine 1, which may be arranged in a motor vehicle, for example, has a fresh gas system 2 for supplying it with fresh gas, preferably air, and an exhaust system 3 for removing the exhaust gas. Such an exhaust system 3 comprises an exhaust line 4, which removes the exhaust gas formed during operation of internal combustion engine 1, carrying it away from internal combustion engine 1. Exhaust system 3 has at least one exhaust gas treatment device 5, which is arranged in exhaust line 4. Exhaust gas treatment device 5 may be an oxidation catalyst, for example, an NOX storage catalyst, a hydrolysis catalyst, an SCR catalyst or a particulate filter. Likewise, single or several of the aforementioned devices may be accommodated in a joint housing, in particular in combination with a muffler. Furthermore, exhaust system 3 has an injection device 6, which injects a liquid educt into exhaust line 4. Injection device 6 is arranged on exhaust line 4 upstream from exhaust gas treatment device 5. The liquid educt may preferably be fuel, in particular the same fuel with which internal combustion engine 1 is also operated. Furthermore, the educt may also be ammonia or urea and/or an aqueous urea solution. If fuel injection is provided, exhaust gas treatment device 5, which is directly next to injection device 6 downstream, is preferably an oxidation catalyst on which the fuel is converted into heat, e.g., to bring the oxidation catalyst to its operating temperature or to heat a particulate filter arranged downstream from the oxidation catalyst to a regeneration temperature. If injection device 6 is designed for injecting ammonia, then exhaust gas treatment device 5 may be an SCR catalyst. If urea is injected, exhaust gas treatment device that follows directly downstream may preferably be a hydrolysis catalyst in which the urea is converted to ammonia to act upon a downstream SCR catalyst. Injection device 6 may likewise be followed directly by an exhaust gas treatment device 5 equipped as an SCR catalyst, where the hydrolysis reaction also takes place. In addition, other applications for injection of a liquid educt into the exhaust line directly upstream from an exhaust gas treatment device 5 are also conceivable.

To evaporate the injected liquid educt as rapidly and as thoroughly as possible in the exhaust gas and to mix the evaporated educt as homogeneously as possible with the exhaust gas, exhaust system 3 is also equipped with a mixing and/or evaporation device 7, which is arranged in exhaust line 4 downstream from injection device 6 and upstream from exhaust gas treatment device 5, which is directly adjacent to injection device 6.

Exhaust line 4 is usually formed by several individual sections that are usually joined together. For example, an exhaust bend 8 is provided, including several individual bend pipes 9 and an exhaust manifold 10. In addition, at least one exhaust pipe 11 is provided, having an end section 12 arranged downstream from injection device 6 and upstream from exhaust gas treatment device 5. This end section 12 may protrude into a housing 13 in which exhaust gas treatment device 5 is arranged, as illustrated in FIG. 1. According to FIG. 2, end section 12 may also protrude into another pipe 14 of exhaust line 4, which is adjacent to exhaust pipe 11 downstream with respect to the direction of flow of the exhaust gas.

Figure 3:
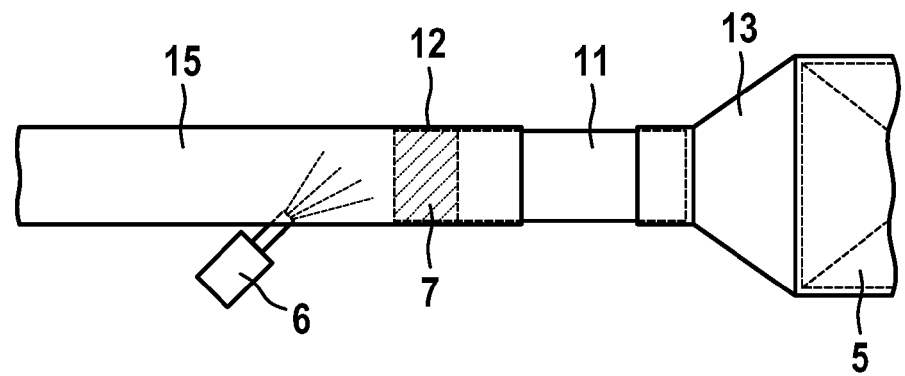

According to FIG. 3, end section 12 may also protrude into a pipe 15, which is adjacent to and upstream from exhaust pipe 11.

In the embodiment shown in FIG. 1, exhaust line 4 includes another pipe 16 between exhaust bend 8 and exhaust pipe 11, where injection device 6 is connected to exhaust line 4 and a pipe 17 leading away from housing 13. The individual components of exhaust line 4 are expediently joined and then soldered or welded to one another. Exhaust pipe 11 together with end section 12 arranged between injection device 6 and exhaust gas treatment device 5 hydraulically forms a section of the exhaust line 4 carrying exhaust gas in terms of technical flow parameters. Exhaust pipe 11 thus includes a part of the exhaust path formed by exhaust line 4, and in the example shown here it separates the exhaust path directly from the environment of exhaust line 4. Alternatively in another embodiment, exhaust pipe 11 may form a pipe that carries exhaust gas, e.g., within a housing of an exhaust gas treatment device, which may contain a catalytic converter, a particulate filter, a muffler and the injection device as well as any combinations thereof, and to this extent it may form a section of exhaust line 4 carrying exhaust gas within the respective housing.

In the case of exhaust system 3 shown here, mixing and/or evaporation device 7 is not formed by an additional and/or separate component, but instead mixing and/or evaporation device 7 is integrally formed on end section 12 of exhaust pipe 11. This eliminates separate manufacturing of mixing and/or evaporation device 7. Likewise, an additional assembly step for installation of such a separate mixing and/or evaporation device 7 into exhaust line 4 is also eliminated.

In the embodiment shown in FIG. 1, exhaust pipe 11 is arranged in such a way that it protrudes at its end section 12 into housing 13 accommodating exhaust gas treatment device 5 in the direction of flow. In this way, mixing and/or evaporation device 7 is positioned directly upstream from exhaust gas treatment device 5. In this embodiment, pipe 16 on which injection device 6 is arranged is inserted into an end 18 at a distance from end section 11.

Figure 2:
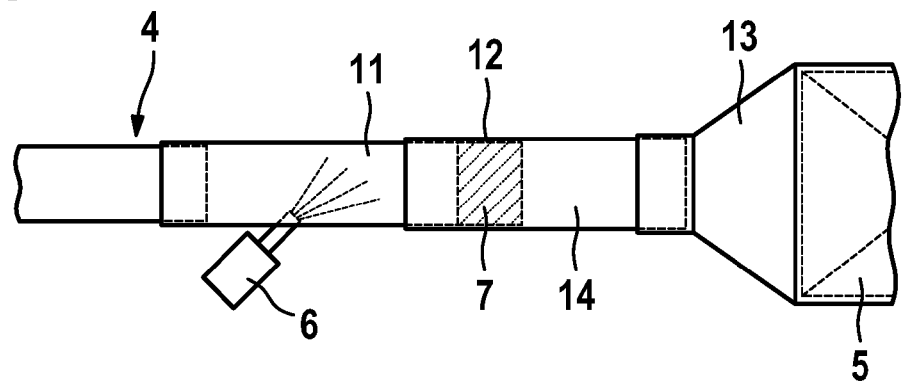
FIGS. 2 and 3 show enlarged details of the exhaust system in other embodiments.

According to FIG. 2, injection device 6 may also be arranged on exhaust pipe 11. In addition, FIG. 2 shows that exhaust pipe 11 equipped with mixing and/or evaporation device 7 need not necessarily be inserted into housing 13 of exhaust gas treatment device 5 but instead it may also be inserted into a different pipe 14 that leads to housing 13 and/or to exhaust gas treatment device 5.

In the embodiments according to FIGS. 1 and 2, exhaust pipe 11 is installed into exhaust line 4 in such a way that its end section 12 is arranged on the outgoing flow end, but FIG. 3 shows an embodiment in which exhaust pipe 11 is arranged with end section 12 on the oncoming flow end so that it is in exhaust line 4. End 18, which is at a distance from end section 12, is inserted here into housing 13. Likewise, an embodiment in which exhaust pipe 11 forms an integral part of housing 13 so that exhaust pipe 11 is a section of housing 13 is envisioned to be in the scope of the present invention.

With reference to FIGS. 4 through 10, various embodiments for implementation of exhaust pipe 11 with mixing and/or evaporation device 7 formed integrally on end section 12 are also explained in greater detail without restriction on generality.

According to FIGS. 4, 5 and 8 through 10, mixing and/or evaporation device 7 includes multiple baffles 19, which are arranged in proximity to one another in the circumferential direction of exhaust pipe 11. In these embodiments in FIGS. 4 and 6, baffles 19 are formed in and/or on end section 12 by corresponding free-cutting and bending deformation of wall sections 20 of exhaust pipe 11. Wall sections 20 here also form end section 12 of exhaust pipe 11.

Figure 4:
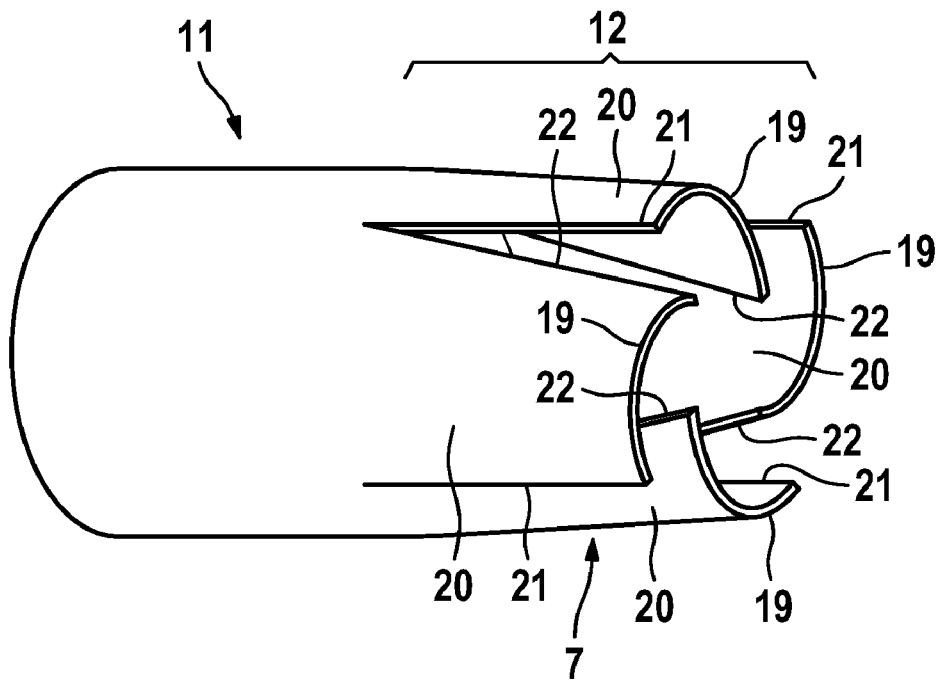
FIG. 4 shows a perspective view of an exhaust pipe having an integrated mixing and/or evaporation device.
Figure 5:
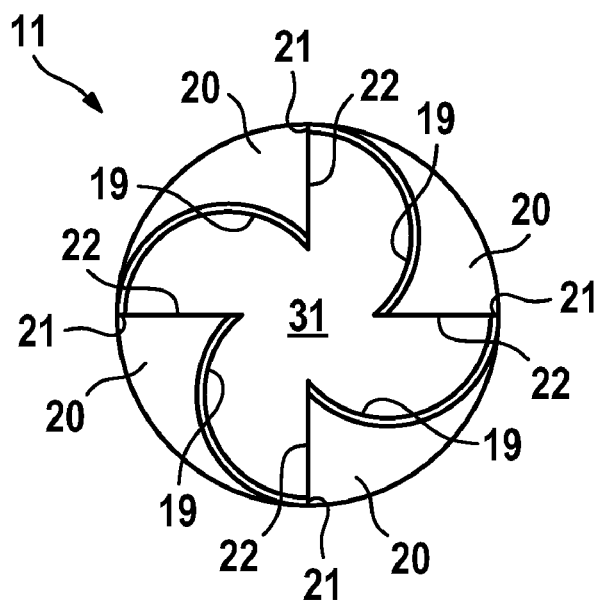
FIG. 5 shows an axial section through the exhaust pipe from FIG. 4.
Figure 6:
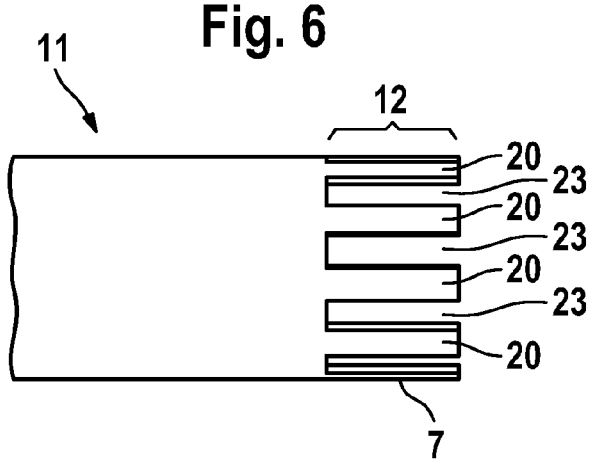
FIG. 6 shows a side view of an exhaust pipe in an intermediate state of a manufacturing process.
Figure 7:
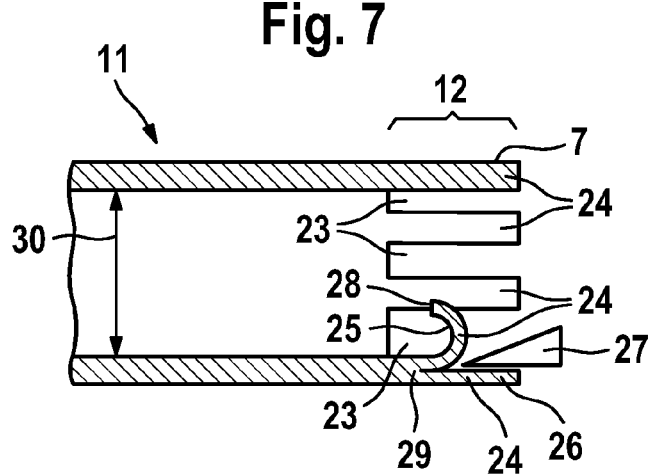
FIG. 7 shows an axial section through an exhaust pipe in an intermediate state in another manufacturing process.

According to FIGS. 4 and 5, individual wall sections 20 may be separated from one another by axial sections in the circumferential direction. The resulting section edges are labeled as 21 and/or 22 in FIGS. 4 and 5. The axial sections are produced by a suitable cutting method or bending method according to the figures. In the embodiment illustrated in FIGS. 4 and 5, wall sections 20 that are in proximity in the circumferential direction are directly adjacent to one another, i.e., in free-cutting wall sections 20, no material is removed from exhaust pipe 11. In contrast with that, FIGS. 6 and 7 show embodiments in a simplified presentation, where wall sections 20 that are adjacent in the circumferential direction are also arranged with a distance between them in the circumferential direction, i.e., a gap 23 is formed between wall sections 20 that are a distance apart from one another in the circumferential direction. Gaps 23 are formed due to removal of other wall sections or pipe parts (not shown here) from exhaust pipe 11 as part of manufacturing mixing and/or evaporation device 7. FIG. 6 shows exhaust pipe 11 after free-cutting wall sections 20, which serve to form baffles 19, in a manufacturing stage prior to bending deformation of wall sections 20.

FIG. 7 shows another possibility for forming baffles 19. In this embodiment, baffles 19 are formed by axial machining and bending deformation of wall sections 24 of exhaust pipe 11. In doing so, baffles 19 are formed by an area 25 of the respective wall section 24 that is on the inside radially by separating this area 25 which is on the inside from the remaining area 26 of the respective wall section 24 that is on the outside radially by a machining operation. The axial cutting is indicated in FIG. 7 by a wedge 27, which is cut in wall section 24 in the axial direction. In the cutting, the resulting machined piece remains, i.e., the interior area 25 remains fixedly connected to the other area 26, which is on the outside. Accordingly, baffle 19 is formed at the end by the interior area 25, which is separated axially from wall section 24 by machining from its free end 28 to a connecting point 29, where it develops into wall section 24. Wall section 24 is expediently machined from the axial end of exhaust pipe 11. Likewise it is fundamentally possible to perform this cutting in such a way that an area situated between the axial ends of the exhaust pipe 11 is cut.

In the embodiment shown in FIG. 7, individual wall sections 24 whose area 25 on the inside radially is formed by machining baffles 19 is cut free in advance in such a way that gaps 23 are again formed between wall sections 24 adjacent to one another in the circumferential direction.

Figure 8:
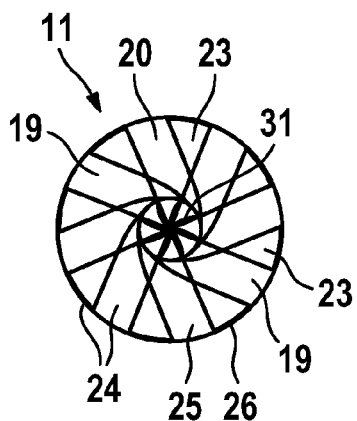
FIGS. 8 through 10 illustrate axial views of an exhaust pipe like that in FIG. 5 but in different embodiments.

In the embodiments of FIGS. 6 through 8, gaps 23 formed between wall sections 24 that are in proximity to one another in the circumferential direction are designed to have a rectangular profile. In the embodiments shown in FIGS. 9 and 10, gaps 23 formed between wall sections 24 adjacent to one another in the circumferential direction are designed to be triangular. It is likewise fundamentally possible for gaps 23 between wall sections 24 that are adjacent to one another in the circumferential direction to be designed to be trapezoidal in shape.

Bending deformation of the free-cut wall sections 24 and/or the machined wall sections 24 and/or the respective inner area 25 is performed according to FIGS. 4, 5 and 8 through 10 by means of a helical deformation, for example, in which the respective wall section 20 and/or 24 and/or the area 25 is bent into the cross section 30 through which the flow can pass (see FIG. 7).

Wall sections 20, 24 and/or the respective area 25 are curved so that the one section edge 22 is straight and is inclined inward radially with respect to the axial direction. In addition, the other cut edge 21 may also be straight and may extend axially according to the embodiment illustrated in FIGS. 4 and 5. Alternatively, the other cut edge 21 according to FIG. 8 may extend in a straight line and may also be inclined radially inward with respect to the axial direction, but the two cut edges 21, 22 expediently have different angles of inclination with respect to the axial direction. In the case of the embodiments shown here, baffles 19 are expediently shaped such a way that they impose a swirling motion about the longitudinal central axis of exhaust pipe 11 on the flow of exhaust gas carried in exhaust pipe 10. In particular, baffles 19 may be shaped in such a way that with their free ends they form a propeller-shaped passage 31 for the exhaust gas flow according to FIGS. 5 and 8 through 10.

Figure 9:
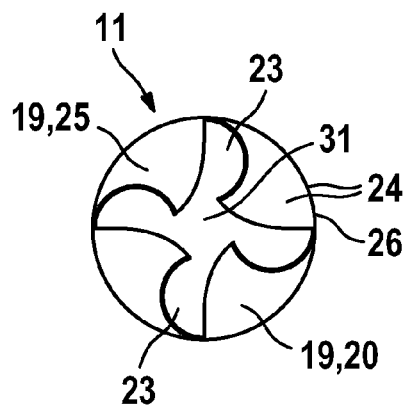
Figure 10:
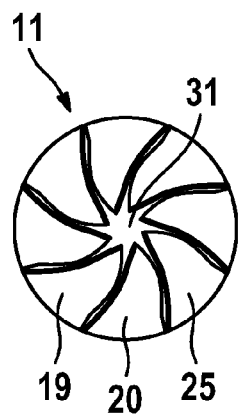

In the embodiments according to FIGS. 4, 5 and 9, mixing and/or evaporation device 7 has four baffles 19 whereas in the embodiments according to FIGS. 8 and 10, eight baffles 19 are provided in each case. The four or eight baffles 19 are shown merely as an example and without in any way restricting the general scope of the invention, so that more or fewer baffles 19 may also be provided.

What is claimed is:

1. An exhaust system for an internal combustion engine, said exhaust system comprising:
   an exhaust line that carries exhaust gas away from the internal combustion engine;
   at least one exhaust gas treatment device arranged in said exhaust line;
   an injection device arranged on said exhaust line upstream from said exhaust gas treatment device for injection of a liquid educt into said exhaust line;
   a mixing and/or evaporation device arranged in said exhaust line downstream from said injection device and upstream from said exhaust gas treatment device for the injected educt,
   wherein at least one section of said exhaust line carrying the exhaust gas is formed by an exhaust pipe, said exhaust pipe having an end section arranged downstream from said injection device and upstream from said exhaust gas treatment device, said end section protruding into another upstream or downstream neighboring pipe of said exhaust line or into a housing containing the exhaust gas treatment device,
   wherein said mixing and/or evaporation device is formed integrally on the end section of said exhaust pipe, and
   wherein said mixing and/or evaporation device comprises a plurality of baffles, said baffles are shaped so that they impose on the exhaust gas flow a swirling component about the longitudinal central axis of the exhaust pipe.

2. The exhaust system according to claim 1, wherein said baffles are formed in or on said end section of said exhaust pipe by free-cut wall sections of said exhaust pipe after a bending deformation.

3. The exhaust system according to claim 2, wherein said wall sections form the end section of said exhaust pipe.

4. The exhaust system according to claim 1, wherein said baffles are formed in the end section of said exhaust pipe by axial machining and bending deformation of wall sections of said exhaust pipe.

5. The exhaust system according to claim 4, wherein each said baffle is formed by an area of the wall section that is on the inside radially and is separated axially from the wall section by machining from its free end up to a connection point, where it develops into the wall sections.

6. The exhaust system according to claim 4, wherein said wall sections are machined from the end of said exhaust pipe.

7. The exhaust system according to claim 2, wherein said wall sections are separated from one another in a circumferential direction by axial cuts.

8. The exhaust system according to claim 2, wherein said wall sections define a plurality of gaps between said wall sections that are adjacent in the circumferential direction by free-cutting the wall sections.

9. The exhaust system according to claim 8, wherein said gaps are formed by cutting pipe parts of rectangular or triangular or trapezoidal shapes out of said exhaust pipe between the wall sections adjacent to one another in the circumferential direction.

10. An exhaust system for an internal combustion engine, said exhaust system comprising:
an exhaust line that carries exhaust gas away from the internal combustion engine;
at least one exhaust gas treatment device arranged in said exhaust line;
an injection device arranged on said exhaust line upstream from said exhaust gas treatment device for injection of a liquid educt into said exhaust line;
a mixing and/or evaporation device arranged in said exhaust line downstream from said injection device and upstream from said exhaust gas treatment device for the injected educt, said mixing and/or evaporation device comprises a plurality of baffles being formed in or on said end section of said exhaust pipe by free-cut wall sections of said exhaust pipe after a bending deformation in a helical pattern into the cross section of said exhaust pipe,
wherein said wall sections are separated from one another in a circumferential direction by axial cuts, and
wherein at least one section of said exhaust line carrying the exhaust gas is formed by an exhaust pipe, said exhaust pipe having an end section arranged downstream from said injection device and upstream from said exhaust gas treatment device, said end section protruding into another upstream or downstream neighboring pipe of said exhaust line or into a housing containing the exhaust gas treatment device, and
wherein said mixing and/or evaporation device is formed integrally on the end section of said exhaust pipe.

11. The exhaust system according to claim 10 wherein said baffles are bent so that the one cut edge or the longitudinal side is straight and is inclined radially inward with respect to the axial direction, while the other cut edge or longitudinal side is straight and extends axially and is also inclined radially inward with respect to the axial direction but at a different angle.

12. An exhaust system for an internal combustion engine, said exhaust system comprising:
an exhaust line that carries exhaust gas away from the internal combustion engine;
at least one exhaust gas treatment device arranged in said exhaust line;
an injection device arranged on said exhaust line upstream from said exhaust gas treatment device for injection of a liquid educt into said exhaust line;
a mixing and/or evaporation device arranged in said exhaust line downstream from said injection device and upstream from said exhaust gas treatment device for the injected educt,
wherein at least one section of said exhaust line carrying the exhaust gas is formed by an exhaust pipe, said exhaust pipe having an end section arranged downstream from said injection device and upstream from said exhaust gas treatment device, said end section protruding into another upstream or downstream neighboring pipe of said exhaust line or into a housing containing the exhaust gas treatment device,
wherein said mixing and/or evaporation device is formed integrally on the end section of said exhaust pipe and comprises a plurality of baffles, said baffles being formed in or on said end section of said exhaust pipe by free-cut wall sections of said exhaust pipe after a bending deformation, and
wherein said baffles are shaped so that they impose on the exhaust gas flow a swirling component about the longitudinal central axis of the exhaust pipe.

13. An exhaust system for an internal combustion engine, said exhaust system comprising:
an exhaust line that carries exhaust gas away from the internal combustion engine;
at least one exhaust gas treatment device arranged in said exhaust line;
an injection device arranged on said exhaust line upstream from said exhaust gas treatment device for injection of a liquid educt into said exhaust line;
a mixing and/or evaporation device arranged in said exhaust line downstream from said injection device and upstream from said exhaust gas treatment device for the injected educt,
wherein at least one section of said exhaust line carrying the exhaust gas is formed by an exhaust pipe, said exhaust pipe having an end section arranged downstream from said injection device and upstream from said exhaust gas treatment device, said end section protruding into another upstream or downstream neighboring pipe of said exhaust line or into a housing containing the exhaust gas treatment device,
wherein said mixing and/or evaporation device is formed integrally on the end section of said exhaust pipe and comprises a plurality of baffles, said baffles being formed in or on said end section of said exhaust pipe by free-cut wall sections of said exhaust pipe after a bending deformation, and
wherein said baffles are shaped so that with their free ends they form a propeller-shaped passage for the exhaust gas flow.

\* \* \* \* \*